United States Patent
Willis (10) Patent No.: US 6,253,555 B1
(45) Date of Patent: Jul. 3, 2001

(54) COMBUSTION CHAMBER COMPRISING MIXING DUCTS WITH FUEL INJECTORS VARYING IN NUMBER AND CROSS-SECTIONAL AREA

(75) Inventor: Jeffrey D Willis, Conventry (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/373,748

(22) Filed: Aug. 13, 1999

(30) Foreign Application Priority Data

Aug. 21, 1998 (GB) .................................................. 9818160

(51) Int. Cl.⁷ .................................................... F02C 1/00
(52) U.S. Cl. ................ 60/737; 60/733; 60/742; 60/746; 60/748; 60/751
(58) Field of Search .............................. 60/737, 742, 746, 60/748, 751, 733, 747

(56) References Cited

U.S. PATENT DOCUMENTS

| | | | |
|---|---|---|---|
| 5,319,935 | * 6/1994 | Toon et al. | 60/733 |
| 5,319,936 | 6/1994 | Ikeda . | |
| 5,323,614 | 6/1994 | Tsukahara . | |
| 5,450,725 | 9/1995 | Takahara . | |
| 5,628,192 | * 5/1997 | Hayes-Bradley et al. | 60/733 |
| 5,713,206 | 2/1998 | Mcwhirter . | |

FOREIGN PATENT DOCUMENTS

| | | |
|---|---|---|
| 0148599A2 | 7/1985 | (EP) . |
| 2214630 | 9/1989 | (GB) . |

* cited by examiner

Primary Examiner—Charles G. Freay
Assistant Examiner—Eric Hayes
(74) Attorney, Agent, or Firm—W. Warren Taltavull; Manelli Denison & Selter PLLC (57) ABSTRACT

A three stage lean burn combustion chamber (28) comprises a primary combustion zone (36), a secondary combustion zone (40) and a tertiary combustion zone (44). Each of the combustion zones (36,40,44) is supplied with premixed fuel and air by respective fuel and air mixing ducts (76,78,80, 92). The primary fuel and air mixing ducts (78,78) comprise first and second radial flow swirlers (60,62). The primary fuel injectors (64,66) inject fuel into the first and second swirlers (60,62). The primary fuel injectors (44,66) and the first and second swirlers (60,62) are arranged such the fuel to air ratio of the fuel and air flowing from the passages (61) of the first swirler (60) into the primary combustion zone (36) is different to the fuel to air ratio of the fuel and air flowing from the passages (65) of the second swirler (62) into the primary combustion zone (36). This produces an axial distribution of fuel in the primary combustion zone (36) which reduces the generation of harmful vibrations in the combustion chamber (28).

25 Claims, 4 Drawing Sheets

COMBUSTION CHAMBER COMPRISING MIXING DUCTS WITH FUEL INJECTORS VARYING IN NUMBER AND CROSS-SECTIONAL AREA

The present invention relates generally to a combustion chamber, particularly to a gas turbine engine combustion chamber.

In order to meet the emission level requirements, for industrial low emission gas turbine engines, staged combustion is required in order to minimise the quantity of the oxide of nitrogen (NOx) produced. Currently the emission level requirement is for less than 25 volumetric parts per million of NOx for an industrial gas turbine exhaust. The fundamental way to reduce emissions of nitrogen oxides is to reduce the combustion reaction temperature, and this requires premixing of the fuel and most of the combustion air before combustion occurs. The oxides of nitrogen (NOx) are commonly reduced by a method which uses two stages of fuel injection. Our UK patent no. GB1489339 discloses two stages of fuel injection. Our International patent application no. WO92/07221 discloses two and three stages of fuel injection. In staged combustion, all the stages of combustion seek to provide lean combustion and hence the low combustion temperatures required to minimise NOx. The term lean combustion means combustion of fuel in air where the fuel to air ratio is low, i.e. less than the stoichiometric ratio. In order to achieve the required low emissions of NOx and CO it is essential to mix the fuel and air uniformly.

The industrial gas turbine engine disclosed in our International patent application no. WO92/07221 uses a plurality of tubular combustion chambers, whose axes are arranged in generally radial directions. The inlets of the tubular combustion chambers are at their radially outer ends, and transition ducts connect the outlets of the tubular combustion chambers with a row of nozzle guide vanes to discharge the hot gases axially into the turbine sections of the gas turbine engine. Each of the tubular combustion chambers has two coaxial radial flow swirlers which supply a mixture of fuel and air into a primary combustion zone. An annular secondary fuel and air mixing duct surrounds the primary combustion zone and supplies a mixture of fuel and air into a secondary combustion zone.

One problem associated with gas turbine engines is caused by pressure fluctuations in the air, or gas, flow through the gas turbine engine. Pressure fluctuations in the air, or gas, flow through the gas turbine engine may lead to severe damage, or failure, of components if the frequency of the pressure fluctuations coincides with the natural frequency of a vibration mode of one or more of the components. These pressure fluctuations may be amplified by the combustion process and under adverse conditions a resonant frequency may achieve sufficient amplitude to cause severe damage to the combustion chamber and the gas turbine engine.

It has been found that gas turbine engines which have lean combustion are particularly susceptible to this problem. Furthermore it has been found that as gas turbine engines which have lean combustion reduce emissions to lower levels by achieving more uniform mixing of the fuel and the air, the amplitude of the resonant frequency becomes greater. It is believed that the amplification of the pressure fluctuations in the combustion chamber occurs because the heat released by the burning of the fuel occurs at a position in the combustion chamber which is in phase with the pressure fluctuations.

Accordingly the present invention seeks to provide a combustion chamber which reduces or minimises the above mentioned problem.

Accordingly the present invention provides a combustion chamber comprising at least one combustion zone being defined by at least one peripheral wall and an upstream wall, a first fuel and air mixing duct being arranged to supply air into the at least one combustion zone to produce a first recirculating flow in the at least one combustion zone, a second fuel and air mixing duct being arranged to supply air into the at least one combustion zone to produce a second recirculating flow in the at least one combustion zone, the first and second fuel and air mixing ducts being arranged coaxially, fuel injector means being arranged to supply fuel into the first fuel and air mixing duct and fuel injector means being arranged to supply fuel into the second fuel and air mixing duct, the first and second fuel and air mixing ducts and the fuel injector means being arranged such that there is a predetermined difference in the amount, or proportion, of air and/or fuel supplied to the first and second fuel and air mixing ducts whereby the position of heat release in the first recirculating flow is downstream of the position of heat release in the second recirculating flow.

Preferably the first and second fuel and air mixing ducts and the fuel injector means are arranged such that the fuel to air ratio of the fuel and air flowing from the first fuel and air mixing duct into the at least one combustion zone is greater than the fuel to air ratio of the fuel and air flowing from the second fuel and air mixing duct into the at least one combustion zone.

Preferably the fuel injection apertures of the fuel injector means in the first fuel and air mixing duct have a greater cross-sectional area than the fuel injection apertures of the fuel injector means in the second fuel and air mixing duct.

Alternatively the fuel injector means in the first fuel and air mixing duct may have a greater number of fuel injection apertures than the fuel injector means in the second fuel and air mixing duct.

Alternatively the fuel injection means in the first fuel and air mixing duct comprises a greater number of fuel injectors than the fuel injection means in the second fuel and air mixing duct.

The inlet of the first fuel and air mixing duct may have a greater cross-sectional area than the inlet of the second fuel and air mixing duct.

The first and second fuel and air mixing ducts and the fuel injector means may be arranged such that the fuel to air ratio of the fuel and air flowing from the second fuel and air mixing duct into the at least one combustion zone is greater than the fuel to air ratio of the fuel and air flowing from the first fuel and air mixing duct into the at least one combustion zone.

Preferably the first fuel and air mixing duct comprises a first swirler, the second fuel and air mixing duct comprises a second swirler, the first and second swirlers being arranged to supply air into the at least one combustion chamber through an aperture in the upstream wall, the first fuel and air mixing duct having passages defined between vanes of the first swirler and the second fuel and air mixing duct having passages defined between vanes in the second swirler.

Preferably the fuel injection means and the first fuel and air mixing duct are arranged such that the fuel to air ratio of the fuel and air flowing from at least one of the passages of the first fuel and air mixing duct is different to the fuel to air ratio of the fuel and air flowing from the other passages of the first fuel and air mixing duct.

The vanes of the second swirler may have a greater cross-sectional area than the vanes of the first swirler.

Preferably the first swirler is a radial flow swirler and the second swirler is a radial flow swirler, the first swirler is axially downstream of the second swirler with respect to the axis of the combustion chamber.

Preferably the primary fuel injection means comprises a plurality of hollow members extending axially with respect to the first and second swirlers, each hollow member having a plurality of apertures spaced apart axially along the hollow member to inject fuel into one of the passages defined between the vanes.

Alternatively the primary fuel injection means may comprise passages extending axially in the vanes of the first and second swirlers, each vane having a plurality of apertures spaced apart axially along the vane to inject fuel into one of the passages defined between the vanes.

Preferably the combustion chamber comprises a primary combustion zone and a secondary combustion zone downstream of the primary combustion zone.

Preferably the combustion chamber comprises a primary combustion zone, a secondary combustion zone downstream of the primary combustion zone and a tertiary combustion zone downstream of the secondary combustion zone.

Preferably the first and second fuel and air mixing ducts supply fuel and air into the primary combustion zone.

Preferably at least one secondary fuel and air mixing duct supplies fuel and air into the secondary combustion zone.

Preferably at least one tertiary fuel and air mixing duct supplies fuel and air into the tertiary combustion zone.

Preferably the at least one secondary fuel and air mixing duct comprises a plurality of secondary fuel and air mixing ducts.

Alternatively the at least one secondary fuel and air mixing duct may comprise a single annular fuel and air mixing duct.

The fuel injection means may be arranged to supply 52% of the fuel to the fuel injection means supplying fuel to the first fuel and air mixing duct and 48% of the fuel to the fuel injection means supplying fuel to the second fuel and air mixing duct.

Preferably the fuel injection means supplying fuel to the first fuel and air mixing duct are arranged to supply at least 10% more of the fuel than the fuel injection means supplying fuel to the second fuel and air mixing duct.

Preferably the fuel injection means supplying fuel to the first fuel and air mixing duct are arranged to supply up to about 20% more of the fuel than the fuel injection means supplying fuel to the second fuel and air mixing duct.

The first fuel and air mixing duct may be arranged to supply up to about 5% more air to the combustion zone than the second fuel and air mixing duct.

The fuel injector means are arranged to supply a fuel comprising methane to the least one combustion zone.

The present invention will be more fully described by way of example with reference to the accompanying drawings, in which.

Figure 1:
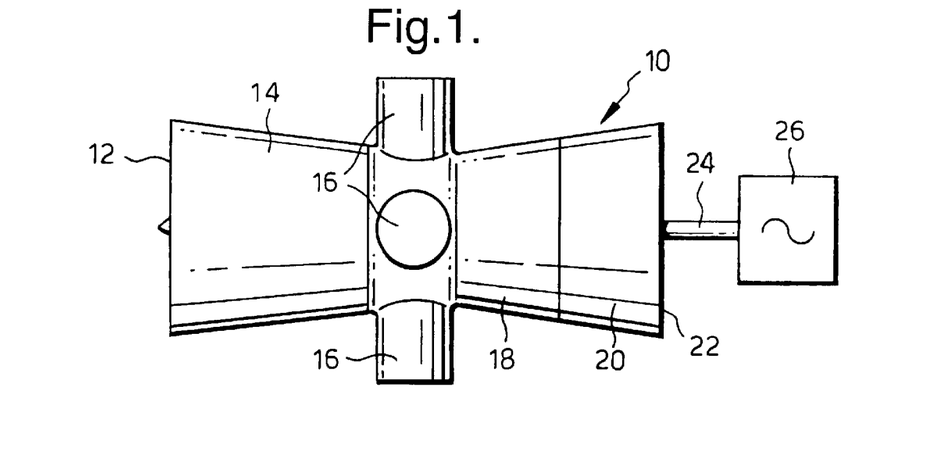
FIG. 1 is a view of a gas turbine engine having a combustion chamber according to the present invention.

An industrial gas turbine engine 10, shown in FIG. 1, comprises in axial flow series an inlet 12, a compressor section 14, a combustion chamber assembly 16, a turbine section 18, a power turbine section 20 and an exhaust 22. The turbine section 20 is arranged to drive the compressor section 14 via one or more shafts (not shown). The power turbine section 20 is arranged to drive an electrical generator 26 via a shaft 24. However, the power turbine section 20 may be arranged to provide drive for other purposes. The operation of the gas turbine engine 10. is quite conventional, and will not be discussed further.

Figure 2:
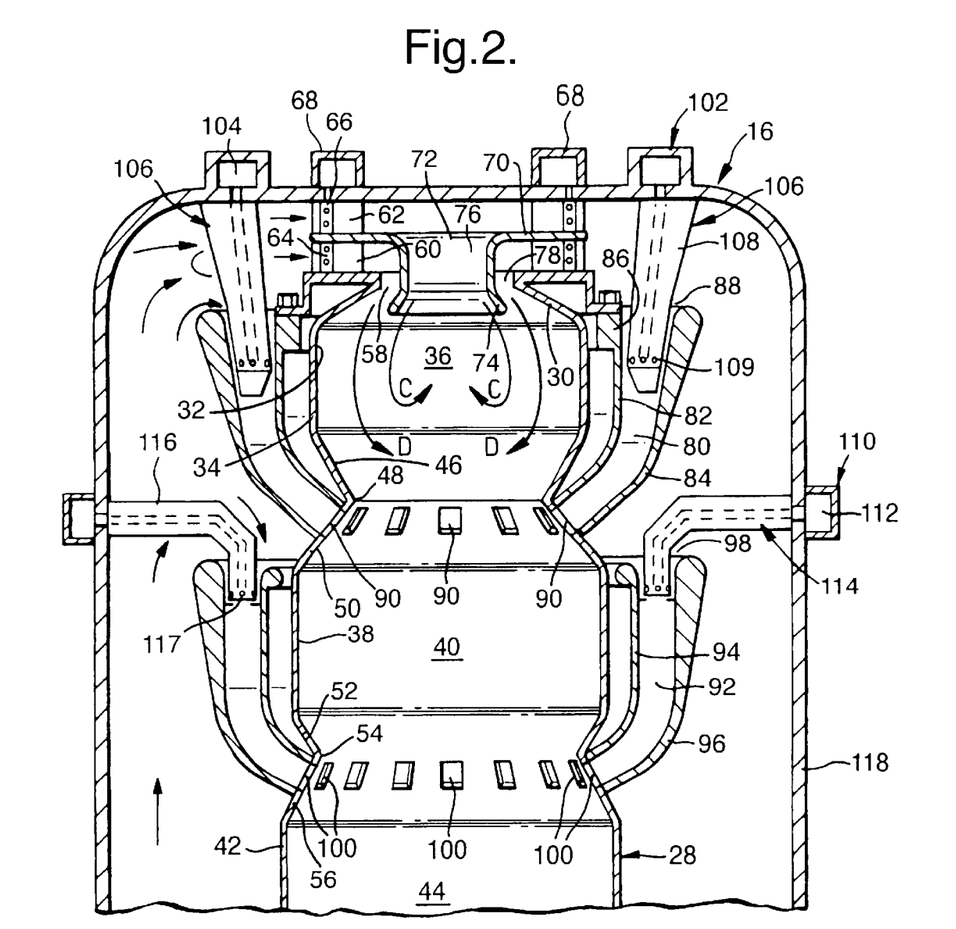
FIG. 2 is an enlarged longitudinal cross-sectional view through the combustion chamber shown in FIG. 1.

The combustion chamber assembly 16 is shown more clearly in FIG. 2. The combustion chamber assembly 16 comprises a plurality of, for example nine, equally circumferentially spaced tubular combustion chambers 28. The axes of the tubular combustion chambers 28 are arranged to extend in generally radial directions. The inlets of the tubular combustion chambers 28 are at their radially outermost ends and their outlets are at their radially innermost ends.

Each of the tubular combustion chambers 28 comprises an upstream wall 30 secured to the upstream end of an annular wall 32. A first, upstream, portion 34 of the annular wall 32 defines a primary combustion zone 36, a second, intermediate, portion 38 of the annular wall 32 defines a secondary combustion zone 40 and a third, downstream, portion 42 of the annular wall 32 defines a tertiary combustion zone 44. The second portion 38 of the annular wall 32 has a greater diameter than the first portion 34 of the annular wall 32 and similarly the third portion 42 of the annular wall 32 has a greater diameter than the second portion 38 of the annular wall 32. The downstream end of the first portion 34 has a first frustoconical portion 46 which reduces in diameter to a throat 48. A second frustoconical portion 50 interconnects the throat 48 and the upstream end of the second portion 38. The downstream end of the second portion 38 has a third frustoconical portion 52 which reduces in diameter to a throat 54. A fourth frustoconical portion 56 interconnects the throat 54 and the upstream end of the third portion 42.

A plurality of equally circumferentially spaced transition ducts are provided, and each of the transition ducts has a circular cross-section at its upstream end. The upstream end of each of the transition ducts is located coaxially with the downstream end of a corresponding one of the tubular combustion chambers 28, and each of the transition ducts connects and seals with an angular section of the nozzle guide vanes.

The upstream wall 30 of each of the tubular combustion chambers 28 has an aperture 58 to allow the supply of air and fuel into the primary combustion zone 36. A first radial flow swirler 60 is arranged coaxially with the aperture 58 and a second radial flow swirler 62 is arranged coaxially with the aperture 58 in the upstream wall 30. The first radial flow swirler 60 is positioned axially downstream, with respect to the axis of the tubular combustion chamber 28, of the second radial flow swirler 60. The first radial flow swirler 60 has a plurality of primary fuel injectors 64, each of which is positioned in a passage 61 formed between two vanes 59 of the radial flow swirler 60. The second radial flow swirler 62 has a plurality of primary fuel injectors 66, each of which is positioned in a passage 65 formed between two vanes 63 of the radial flow swirler 62. The first and second radial flow swirlers 60 and 62 are arranged such that they swirl the air in opposite directions. The first and second radial flow swirlers 60 and 62 share a common side plate 70, the side plate 70 has a central aperture 72 arranged coaxially with the aperture 58 in the upstream wall 30. The side plate 70 has a shaped annular lip 74 which extends in a downstream direction into the aperture 58.

The lip 74 defines an inner primary fuel and air mixing duct 76 for the flow of the fuel and air mixture from the first radial flow swirler 60 into the primary combustion zone 36 and an outer primary fuel and air mixing duct 78 for the flow of the fuel and air mixture from the second radial flow swirler 62 into the primary combustion zone 36. The lip 74 turns the fuel and air mixture flowing from the first and second radial flow swirlers 60 and 62 from a radial direction to an axial direction. The primary fuel and air is mixed together in the passages between the vanes of the first and second radial flow swirlers 60 and 62 and in the primary fuel and air mixing ducts 76 and 78. The primary fuel injectors 64 and 66 are supplied with fuel from primary fuel manifold 68. The side plate 70 and annular lip 74 is arranged to enhance combustion stability in the primary combustion zone 36. The lip 74 ensures that the flows of fuel and air from the first and second radial flow swirlers 60 and 62 respectively are maintained separate until they are discharged into the primary combustion zone 36.

An annular secondary fuel and air mixing duct 80 is provided for each of the tubular combustion chambers 28. Each secondary fuel and air mixing duct 80 is arranged circumferentially around the primary combustion zone 36 of the corresponding tubular combustion chamber 28. Each of the secondary fuel and air mixing ducts 80 is defined between a second annular wall 82 and a third annular wall 84. The second annular wall 82 defines the inner extremity of the secondary fuel and air mixing duct 80 and the third annular wall 84 defines the outer extremity of the secondary fuel and air mixing duct 80. The axially upstream end 86 of the second annular wall 82 is secured to a side plate of the first radial flow swirler 60. The axially upstream ends of the second and third annular walls 82 and 84 are substantially in the same plane perpendicular to the axis of the tubular combustion chamber 28. The secondary fuel and air mixing duct 80 has a secondary air intake 88 defined radially between the upstream end of the second annular wall 82 and the upstream end of the third annular wall 84.

At the downstream end of the secondary fuel and air mixing duct 80, the second and third annular walls 82 and 84 respectively are secured to the second frustoconical portion 50 and the second frustoconical portion 50 is provided with a plurality of apertures 90. The apertures 90 are arranged to direct the fuel and air mixture into the secondary combustion zone 40 in a downstream direction towards the axis of the tubular combustion chamber 28. The apertures 90 may be circular or slots.

The secondary fuel and air mixing duct 80 reduces in cross-sectional area from the intake 88 at its upstream end to the apertures 90 at its downstream end. The shape of the secondary fuel and air mixing duct 80 produces an accelerating flow through the duct 80 without any regions where recirculating flows may occur.

An annular tertiary fuel and air mixing duct 92 is provided for each of the tubular combustion chambers 28.

Each tertiary fuel and air mixing duct 92 is arranged circumferentially around the secondary combustion zone 40 of the corresponding tubular combustion chamber 28. Each of the tertiary fuel and air mixing ducts 92 is defined between a fourth annular wall 94 and a fifth annular wall 96. The fourth annular wall 94 defines the inner extremity of the tertiary fuel and air mixing duct 92 and the fifth annular wall 96 defines the outer extremity of the tertiary fuel and air mixing duct 92. The axially upstream ends of the fourth and fifth annular walls 94 and 96 are substantially in the same plane perpendicular to the axis of the tubular combustion chamber 28. The tertiary fuel and air mixing duct 92 has a tertiary air intake 98 defined radially between the upstream end of the fourth annular wall 94 and the upstream end of the fifth annular wall 96.

At the downstream end of the tertiary fuel and air mixing duct 92, the fourth and fifth annular walls 94 and 96 respectively are secured to the fourth frustoconical portion 56 and the fourth frustoconical portion 56 is provided with a plurality of apertures 100. The apertures 100 are arranged to direct the fuel and air mixture into the tertiary combustion zone 44 in a downstream direction towards the axis of the tubular combustion chamber 28. The apertures 100 may be circular or slots.

The tertiary fuel and air mixing duct 92 reduces in cross-sectional area from the intake 98 at its upstream end to the apertures 100 at its downstream end. The shape of the tertiary fuel and air mixing duct 92 produces an accelerating flow through the duct 92 without any regions where recirculating flows may occur.

A plurality of secondary fuel systems 102 are provided, to supply fuel to the secondary fuel and air mixing ducts 80 of each of the tubular combustion chambers 28. The secondary fuel system 102 for each tubular combustion chamber 28 comprises an annular secondary fuel manifold 104 arranged coaxially with the tubular combustion chamber 28 at the upstream end of the tubular combustion chamber 28. Each secondary fuel manifold 104 has a plurality, for example thirty two, of equi-circumferentially spaced secondary fuel injectors 106. Each of the secondary fuel injectors 106 comprises a hollow member 108 which extends axially with respect to the tubular combustion chamber 28, from the secondary fuel manifold 104 in a downstream direction through the intake 88 of the secondary fuel and air mixing duct 80 and into the secondary fuel and air mixing duct 80. Each hollow member 108 extends in a downstream direction along the secondary fuel and air mixing duct 80 to a position, sufficiently far from the intake 88, where there are no recirculating flows in the secondary fuel and air mixing duct 80 due to the flow of air into the duct 80. The hollow members 108 have a plurality of apertures 109 to direct fuel circumferentially towards the adjacent hollow members 108. The secondary fuel and air mixing duct 80 and secondary fuel injectors 106 are discussed more fully in our European patent application EP0687864A.

A plurality of tertiary fuel systems 110 are provided, to supply fuel to the tertiary fuel and air mixing ducts 92 of each of the tubular combustion chambers 28. The tertiary fuel system 110 for each tubular combustion chamber 28 comprises an annular tertiary fuel manifold 112 positioned outside a casing 118, but may be positioned inside the casing 118. Each tertiary fuel manifold 112 has a plurality, for example thirty two, of equi-circumferentially spaced tertiary fuel injectors 114. Each of the tertiary fuel injectors 114 comprises a hollow member 116 which extends initially radially and then axially with respect to the tubular combustion chamber 28, from the tertiary fuel manifold 112 in a downstream direction through the intake 98 of the tertiary fuel and air mixing duct 92 and into the tertiary fuel and air mixing duct 92. Each hollow member 116 extends in a downstream direction along the tertiary fuel and air mixing duct 92 to a position, sufficiently far from the intake 98, where there are no recirculating flows in the tertiary fuel and air mixing duct 92 due to the flow of air into the duct 92. The hollow members 116 have a plurality of apertures 117 to direct fuel circumferentially towards the adjacent hollow members 117.

The lip 74 and the first and second radial flow swirlers 60 and 62 respectively produce a recirculating zone in the primary combustion zone 36, and the recirculating zone comprises a radially inner and a radially outer recirculating flow. The lip 74 causes the inner recirculating flow, produced by the second radial flow swirler 62 to be the dominant flow. Hence the second radial flow swirler 62 controls the stability of the combustion process in the primary combustion zone 36. It is preferred to maintain the inner recirculating flow at a predetermined temperature above the weak extinction temperature. The outer recirculating flow only has a minor effect on the stability of the combustion process in the primary combustion zone 36.

As discussed previously the fuel and air supplied to the combustion zones is premixed and each of the combustion zones is arranged to provide lean combustion to minimise NOx. The products of combustion from the primary combustion zone 36 flow through the throat 48 into the secondary combustion zone 40 and the products of combustion from the secondary combustion zone 40 flow through the throat 54 into the tertiary combustion zone 44. Due to pressure fluctuations in the air flow into the tubular combustion chambers 28, the combustion process amplifies the pressure fluctuations for the reasons discussed previously and may cause components of the gas turbine engine to become damaged.

Figure 3:
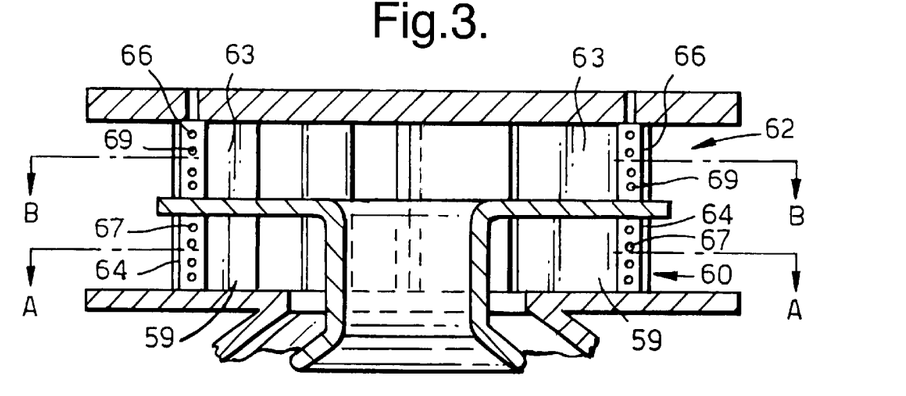
FIG. 3 is an enlarged longitudinal cross-sectional view through the combustion chamber shown in FIG. 2 showing the primary fuel and air mixing ducts.
Figure 4:
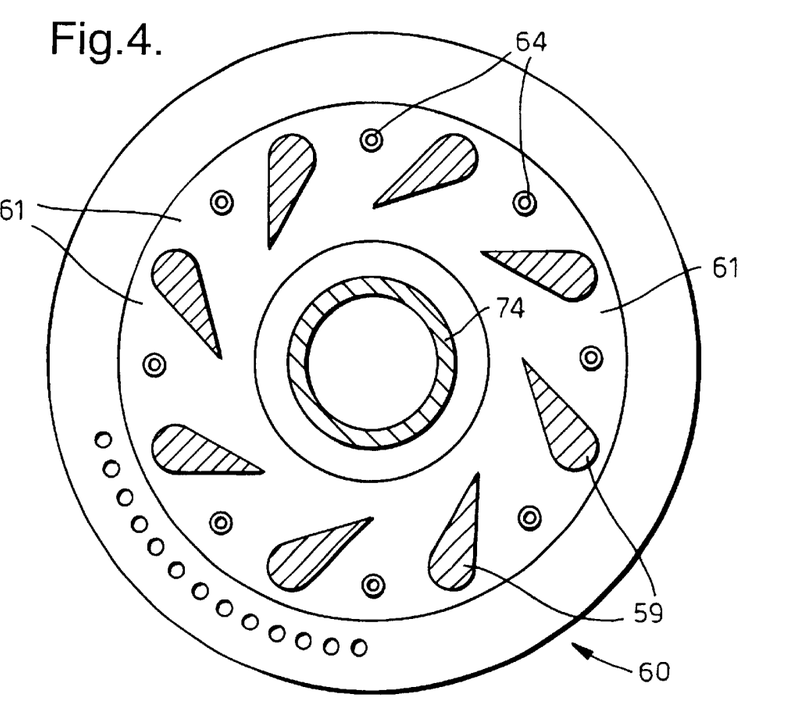
FIG. 4 is a cross-sectional view in the direction of arrows A—A through the primary fuel and air mixing ducts shown in FIG. 3.
Figure 5:
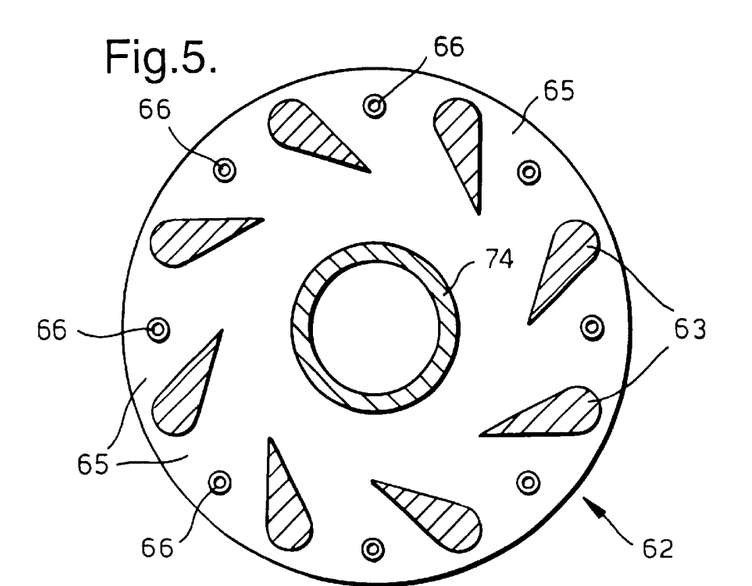
FIG. 5 is a cross-sectional view in the direction of arrows B—B through the primary fuel and air mixing ducts shown in FIG. 3.

The first and second radial flow swirlers 60 and 62 and the primary fuel injectors 64 and 66 are shown more clearly in FIGS. 3, 4 and 5. The first radial flow swirler 60 comprises a plurality of vanes 59 between which are defined a plurality of passages 61. The primary fuel injectors 64 are positioned in the passages 61. The second radial flow swirler 62 comprises a plurality of vanes 63 between which are defined a plurality of passages 65. The primary fuel injectors 66 are positioned in the passages 65.

Each of the primary fuel injectors 64 and 66 comprises a hollow cylindrical member which extends axially with respect to the axis of the combustion chamber 28 and parallel to the axis of the combustion chamber 28. Each primary fuel injector 64 and 66 has a plurality of apertures 67 and 69 respectively spaced apart axially along its length to inject fuel into the air flowing through the passages 61 and 65 respectively. The apertures 67 in the primary fuel injectors 64 have a greater diameter than the apertures 69 in the primary fuel injectors 66 such that more fuel is supplied into the passages 61 than into the passages 65 in order to produce a greater fuel to air ratio in the passages 61 than in the passages 65, as shown more clearly at the left hand side of FIG. 3.

Additionally the apertures 67 in the primary fuel injectors 62 in some of the passages 61 may be arranged to have a greater diameter than the apertures 67 in the primary fuel injectors 62 in the remaining passages 61 such that more fuel is supplied into some of the passages 61 than into the remaining passages 61 in order to produce a greater fuel to air ratio in some of the passages 61 than in the remaining passages 61.

Thus the arrangement causes, for example about 52% of the primary fuel to be supplied by the primary fuel injectors 64 to the first radial flow swirler 60 and about 48% of the primary fuel to be supplied by the primary fuel injectors 66 to the second radial flow swirler 62. In addition a predetermined number greater, or less, than 50% of the primary fuel injectors 64 inject any suitable predetermined amount of fuel more, or less, than the remaining primary fuel injectors 64. For example five of the eight primary fuel injectors 64 inject 30% more fuel that the other three primary fuel injectors 64 and four of the said five primary fuel injectors 64 are adjacent to each other and the fifth of the said primary fuel injectors 64 is spaced from the other four of the said five primary fuel injectors 64. This produces for example an average temperature in the primary combustion zone 36 of 1850° K., the temperature in the inner recirculating flow is about 1785° K. and the temperature in the outer recirculating flow is between a minimum of 1765° K. and a maximum of 2015° K.

This increases the amount of NOx produced in the primary combustion zone 36, however this only effects about 15% of the fuel in a series stage combustion chamber 28 and the overall increase in NOx emissions is small about 2 volumetric part per million relative to the existing emission levels. However, these changes have moved the region of heat release in the outer recirculating flow axially in the primary combustion zone 36 and thus the amplification of noise in the primary combustion zone 36 is reduced to acceptable levels. It is believed that the supplying more fuel to the first radial flow swirler 60 reduces the temperature of the inner recirculating flow in the primary combustion zone 36, which in turn delays the initiation of combustion in the outer recirculating flow in the primary combustion zone 36.

An additional benefit is that there is a temperature gradient radially across the gases flowing from the primary combustion zone 36 to the secondary combustion zone 40, with the temperature being greatest at the radially outermost region of the primary combustion zone 36 and smallest at the radially innermost region of the primary combustion zone 36. This results in further preheating of the secondary combustion zone 40 close to the point where the secondary fuel and air mixing ducts 80 inject the secondary fuel and air mixture into the secondary combustion zone 40. These changes have also moved the region of heat release in the secondary combustion zone 40 and thus the amplification of noise in the secondary combustion zone 36 is reduced.

Thus by appropriate selection of the amount of fuel biasing to the primary fuel injectors 64 in the first radial flow swirler 60 it is possible to reduce the amplification of noise in the secondary combustion zone 40 acceptable levels. For example it is believed that by supplying 10% more fuel to the primary fuel injectors 64 in the first radial flow swirler 60 than to the primary fuel injectors 64 in the second radial flow swirler 62 the noise produced in the primary combustion zone 36 is reduced to acceptable levels, preferably it eliminates noise, and only reduces noise produced in the secondary combustion zone 40. However, it is believed that by supplying 20% more fuel to the primary fuel injectors 64 in the first radial flow swirler 60 than to the secondary fuel injectors 64 in the second radial flow swirler 62 the noise produced in the primary combustion zone 36 is reduced to acceptable levels, preferably it eliminates noise, and reduces noise produced in the secondary combustion zone 40 to acceptable levels, preferably it eliminates noise, in the secondary combustion zone 40.

A further benefit is that the CO emission levels are reduced.

Alternatively, or in addition, it may be possible to arrange the apertures 67 in the primary fuel injectors 64 and the apertures 69 in the primary fuel injectors 66 to have equal diameters, but to provide a greater number of apertures 67 in the primary fuel injectors 64 than the number of apertures 69 in the primary fuel injectors 66, as shown more clearly at the right hand side of FIG. 3.

Figure 6:
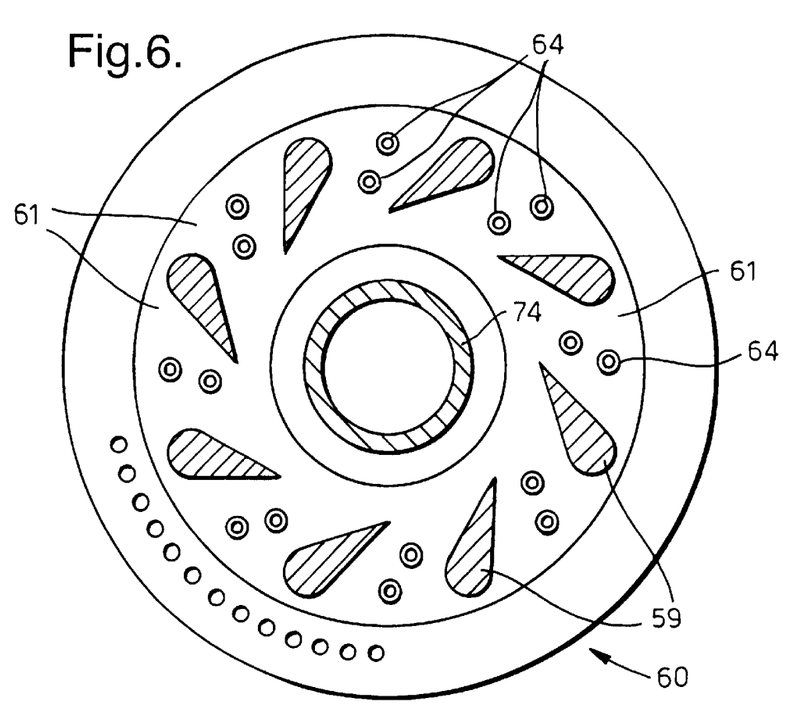
FIG. 6 is an alternative cross-sectional view in the direction of arrows A—A through the primary fuel and air mixing ducts shown in FIG. 3.

Alternatively it may also be possible to provide a greater number of primary fuel injectors 64 in each passage 61 than the number of primary fuel injectors 66 in each passage 66, as shown in FIG. 6.

It may also be possible to provide fuel passages in the vanes 59 and 63 such that the vanes 59 and 63 are the primary fuel injectors and to provide the apertures 67 and 69 in the vanes 59 and 63.

Figure 7:
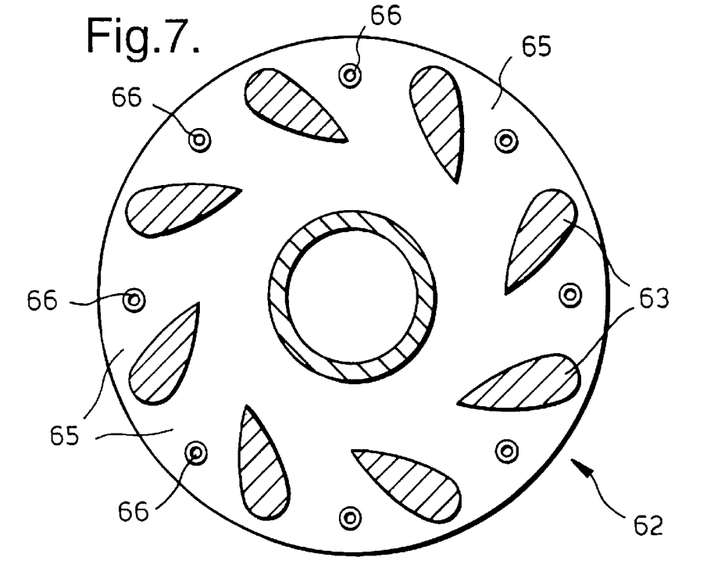
FIG. 7 is an alternative cross-sectional view in the direction of arrows A—A through the primary fuel and air mixing ducts shown in FIG. 3.

A further possibility, as shown in FIG. 7, is to arrange the apertures 67 in the primary fuel injectors 64 and the apertures 69 in the primary fuel injectors 66 to have equal diameters, and equal numbers, but to arrange the cross-sectional area of the passages 61 of the first radial flow swirler 60 to be greater than the cross-sectional area of the passages 65 of the second radial flow swirler 62 in order to produce a greater fuel to air ratio in the passages 65 of the second radial flow swirler 62 than in the passages 61 of the first radial flow swirler 60, by arranging the cross-sectional areas of the vanes 63 to be greater than the cross-sectional area of the vanes 59.

Additionally to reduce the noise produced in the secondary combustion zone 40 it is necessary to increase the amount of air supplied to the primary combustion zone 36 and to reduce the amount of air supplied to the secondary combustion zone 40 or to reduce the amount of air supplied to the secondary and tertiary combustion zones 40 and 44 respectively. For example one possibility is to supply 5% more air to the first radial flow swirler 60 than the second radial flow swirler 62. Thus the amount, or proportional increase, of air supplied to the primary combustion zone, from the first radial flow swirler 60, is dictated by the particular arrangement of the combustion chamber for example the relative sizes of the primary, secondary and tertiary combustion zones 36, 40 and 44 respectively.

An advantage of supplying more air to the first radial flow swirler 60 is that there are no regions of higher temperature as are produced by supplying more fuel to the first radial flow swirler 60.

Figure 8:
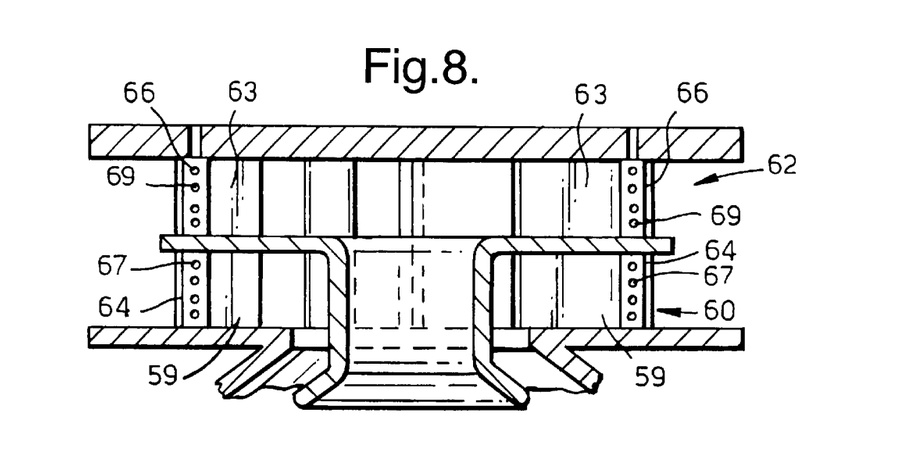
FIG. 8 is an alternative enlarged longitudinal cross-sectional view through the combustion chamber shown in FIG. 2 showing the primary fuel and air mixing ducts.

Alternatively, as shown in FIG. 8, the axial spacing between the side plate 70 and the other side plate of the first radial flow swirler 60 may be greater than the axial spacing between the side plate 70 and the other side plate of the second radial flow swirler 62. This may also be achieved by positioning blocking members between each of the adjacent vanes 63 in the second swirler 62.

The use of the first and second radial flow swirlers 60 and 62 respectively produces two recirculating flows as mentioned above and both of these recirculating flows has its own heat release region. If the position of heat release of the recirculating flow from the first radial flow swirler 60 coincides axially with the position of heat release of the recirculating flow from the second radial flow swirler 62 then the pressure fluctuations will be amplified.

The present invention controls the relative positions of heat release of the recirculating flows from the first and second radial flow swirlers 60 and 62 respectively by controlling the heat (mass and temperature) transferred from the recirculating flow from the second radial flow swirler 62 to the recirculating flow from the first radial flow swirler 60. The position of heat release of the recirculating flow from the first radial flow swirler 60 is dependant upon the relative air mass flow and the temperature of the recirculating flow from the second radial flow swirler 62. Thus the present invention controls the position of heat release in the recirculating flow from the first radial flow swirler 60 by supplying more fuel to the first radial flow swirler 60 than to the second radial flow swirler 62 and supplying the same amount of air. This results in the recirculating flow from the second radial flow swirler 62 being cooler and hence combustion in the recirculating flow from the first radial flow swirler 60 does not occur until further axially downstream of the position of heat release in the recirculating flow of the second radial flow swirler 62. Alternatively the invention controls the position of heat release by supplying more air to the first radial flow swirler 60 than to the second radial flow swirler 62 and supplying the same amount of fuel. This results in the recirculating flow from the first radial flow swirler 60 requiring more heat and hence combustion in the recirculating flow from the first radial flow swirler 60 does not occur until further axially downstream of the position of heat release in the recirculating flow from the second radial flow swirler 62.

The fuel supplied to the fuel injectors must be methane or comprises methane. The use of other fuels such as propane, ethane, hydrogen and all liquid fuels will have a negligible effect on the movement of the position of heat release in the first recirculating flow because the delay times for methane is about two orders of magnitude greater and thus there will be only a minor variation in preheat of the first recirculating flow.

The present invention uses a permanent biasing of fuel to the first radial flow swirler so that there is a predetermined difference in the amount, or proportion, of fuel supplied to the radial flow swirlers. There is no need for valves to control the fuel supply. Alternatively the present invention uses a permanent biasing of air to the first radial flow swirler so that there is there is a predetermined difference in the amount, or proportion, of air supplied to the radial flow swirlers.

In the first radial flow swirler it may also be possible to maintain the apertures of the primary fuel injectors equal and to reduce the cross-sectional area of some of the passages relative to the remaining passages in order to produce a greater fuel to air ratio in some of the passages than in the remaining passages. It may also be possible to provide more primary fuel injectors in some of the passages relative to the remaining passages in order to produce a greater fuel to air ratio in some of the passages than in the remaining passages.

Although the present invention has referred to radial flow swirlers to direct the fuel and air into the primary combustion zone, it may be possible to use axial flow swirlers and additionally it may be possible to use radial flow passages without swirlers, the latter relying on sudden expansion of the fuel and air mixture to create recirculating flows and combustion stability.

The present invention is also applicable to staged combustion chambers in which the walls of the adjacent combustion zones are not connected by throats, but rather there is a gradual increase in cross-sectional area.

The present invention is also applicable to other fuel and air mixing ducts for example the secondary fuel and air mixing ducts, or the tertiary fuel and air mixing ducts. The apertures in some of the secondary fuel injectors, or tertiary fuel injectors, may be greater than those in the remaining fuel injectors in order to produce a greater fuel to air ratio in some of parts of the fuel and air mixing duct. Alternatively the areas of the outlet apertures of the secondary fuel and air mixing ducts, or tertiary fuel and air mixing duct, may not be equal.

I claim:

1. A combustion chamber comprising at least one combustion zone being defined by at least one peripheral wall and an upstream wall, a first fuel and air mixing duct being arranged to supply air into the at least one combustion zone to produce a first recirculating flow in the at least one combustion zone, a second fuel and air mixing duct being arranged to supply air into the at least one combustion zone to produce a second recirculating flow in the at least one combustion zone, the first and second fuel and air mixing ducts being arranged coaxially, fuel injector means being arranged to supply fuel into the first fuel and air mixing duct and fuel injector means being arranged to supply fuel into the second fuel and air mixing duct, the first and second fuel and air mixing ducts and the fuel injector means being arranged such that there is a predetermined difference in the amount, or proportion, of air and/or fuel supplied to the first and second fuel and air mixing ducts whereby the position of heat release in the first recirculating flow is downstream of the position of heat release in the second recirculating flow.

2. A combustion chamber as claimed in claim 1 wherein the first and second fuel and air mixing ducts and the fuel injector means are arranged such that the fuel to air ratio of the fuel and air flowing from the first fuel and air mixing duct into the at least one combustion zone is greater than the fuel to air ratio of the fuel and air flowing from the second fuel and air mixing duct into the at least one combustion zone.

3. A combustion chamber as claimed in claim 1 wherein the fuel injection apertures of the fuel injector means in the first fuel and air mixing duct have a greater cross-sectional area than the fuel injection apertures of the fuel injector means in the second fuel and air mixing duct.

4. A combustion chamber as claimed in claim 1 wherein the fuel injector means in the first fuel and air mixing duct have a greater number of fuel injection apertures than the fuel injector means in the second fuel and air mixing duct.

5. A combustion chamber as claimed in claim 1 or wherein the fuel injection means in the first fuel and air mixing duct comprises a greater number of fuel injectors than the fuel injection means in the second fuel and air mixing duct.

6. A combustion chamber as claimed in claim 1 wherein the first and second fuel and air mixing ducts have inlets, the inlet of the first fuel and air mixing duct have a greater cross-sectional area than the inlets of the second fuel and air mixing duct.

7. A combustion chamber as claimed in claim 1 wherein the first and second fuel and air mixing ducts and the fuel injector means are arranged such that the fuel to air ratio of the fuel and air flowing from the second fuel and air mixing duct into the at least one combustion zone is greater than the fuel to air ratio of the fuel and air flowing from the first fuel and air mixing duct into the at least one combustion zone.

8. A combustion chamber as claimed in claim 1 wherein the first fuel and air mixing duct comprises a first swirler, the second fuel and air mixing duct comprises a second swirler, the first and second swirlers being arranged to supply air into the at least one combustion chamber through an aperture in the upstream wall, the first fuel and air mixing duct having passages defined between vanes of the first swirler and the second fuel and air mixing duct having passages defined between vanes of the second swirler.

9. A combustion chamber as claimed in claim 8 wherein the fuel injection means and the first fuel and air mixing duct are arranged such that the fuel to air ratio of the fuel and air flowing from at least one of the passages of the first fuel and air mixing duct is different to the fuel to air ratio of the fuel and air flowing from the other passages of the first fuel and air mixing duct.

10. A combustion chamber as claimed in claim 8 wherein the vanes of the second swirler have a greater cross-sectional area than the vanes of the first swirler.

11. A combustion chamber as claimed in claim 8 wherein the first swirler is a radial flow swirler and the second swirler is a radial flow swirler, the first swirler is axially downstream of the second swirler with respect to the axis of the combustion chamber.

12. A combustion chamber as claimed in claim 11 wherein the fuel injection means comprises a plurality of hollow members extending axially with respect to the first and second swirlers, each hollow member having a plurality of apertures spaced apart axially along the hollow member to inject fuel into one of the passages defined between the vanes.

13. A combustion chamber as claimed in claim 12 wherein the fuel injection means comprises passages extending axially in the vanes of the first and second swirlers, each vane having a plurality of apertures spaced apart axially along the vane to inject fuel into one of the passages defined between the vanes.

14. A combustion chamber as claimed in claim 1 wherein the combustion chamber comprises a primary combustion zone and a secondary combustion zone downstream of the primary combustion zone.

15. A combustion chamber as claimed in claim 14 wherein the combustion chamber comprises a primary combustion zone, a secondary combustion zone downstream of the primary combustion zone and a tertiary combustion zone downstream of the secondary combustion zone.

16. A combustion chamber as claimed in claim 15 wherein the first and second fuel and air mixing ducts supply fuel and air into the primary combustion zone.

17. A combustion chamber as claimed in claim 14 wherein at least one secondary fuel and air mixing duct supplies fuel and air into the secondary combustion zone.

18. A combustion chamber as claimed in claim 15 wherein at least one tertiary fuel and air mixing duct supplies fuel and air into the tertiary combustion zone.

19. A combustion chamber as claimed in claim 17 wherein the at least one secondary fuel and air mixing duct comprises a plurality of secondary fuel and air mixing ducts.

20. A combustion chamber as claimed in claim 1 wherein the fuel injection means are arranged to supply 52% of the fuel to the fuel injection means supplying fuel to the first fuel and air mixing duct and 48% of the fuel to the fuel injection means supplying fuel to the second fuel and air mixing duct.

21. A combustion chamber as claimed in claim 1 wherein the fuel injection means supplying fuel to the first fuel and air mixing duct are arranged to supply at least 10% more of the fuel than the fuel injection means supplying fuel to the second fuel and air mixing duct.

22. A combustion chamber as claimed in claim 21 wherein the fuel injection means supplying fuel to the first fuel and air mixing duct are arranged to supply up to about 20% more of the fuel than the fuel injection means supplying fuel to the second fuel and air mixing duct.

23. A combustion chamber as claimed in claim 1 wherein the first fuel and air mixing duct is arranged to supply up to about 5% more air to the combustion zone than the second fuel and air mixing duct.

24. A combustion chamber as claimed in claim 1 wherein the fuel injector means are arranged to supply a fuel comprising methane to the at least one combustion zone.

25. A method of operating a combustion chamber comprising at least one combustion zone being defined by at least one peripheral wall and an upstream wall, a first fuel and air mixing duct being arranged to supply air into the at least one combustion zone, a second fuel and air mixing duct being arranged to supply air into the at least one combustion zone, the first and second fuel and air mixing ducts being arranged coaxially, fuel injector means being arranged to supply fuel into the first fuel and air mixing duct, and fuel injector means being arranged to supply fuel into the second fuel and air mixing duct, the method comprising supplying air from the first fuel and air mixing duct to produce a first recirculating flow in the at least one combustion zone, supplying air from the second fuel and air mixing duct to produce a second recirculating flow in the combustion zone, supplying a predetermined difference in the amount, or proportion, of air to the first and second fuel and air mixing ducts and/or supplying a predetermined difference in the amount, or proportion, of fuel to the first and second fuel and air mixing ducts whereby the position of heat release in the first recirculating flow is downstream of the position of heat release in the second recirculating flow.

\* \* \* \* \*